(12) United States Patent
Chae

(10) Patent No.: US 8,250,487 B2
(45) Date of Patent: Aug. 21, 2012

(54) KEY INPUT METHOD AND DEVICE THEREOF

(75) Inventor: Kyu-Yeol Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 548 days.

(21) Appl. No.: 12/484,442

(22) Filed: Jun. 15, 2009

(65) Prior Publication Data

US 2010/0241993 A1    Sep. 23, 2010

(30) Foreign Application Priority Data

Mar. 23, 2009  (KR) .................. 10-2009-0024646

(51) Int. Cl.
*G06F 3/048* (2006.01)

(52) U.S. Cl. ........ 715/830; 715/835; 715/765; 715/810; 715/864; 345/173; 345/467; 345/169

(58) Field of Classification Search .................. 715/700, 715/765, 769, 810, 835, 840, 863, 864, 830; 345/156, 169, 173, 467
See application file for complete search history.

(56) References Cited

U.S. PATENT DOCUMENTS

| | | | | |
|---|---|---|---|---|
| 2007/0013650 A1* | 1/2007 | Ladouceur | ................... | 345/156 |
| 2007/0205920 A1* | 9/2007 | Cho | ................... | 341/35 |
| 2007/0211042 A1* | 9/2007 | Kim et al. | ................... | 345/184 |
| 2009/0265669 A1* | 10/2009 | Kida et al. | ................... | 715/863 |
| 2010/0090959 A1* | 4/2010 | Zaremba | ................... | 345/169 |

* cited by examiner

*Primary Examiner* — Xiomar L Bautista

(74) *Attorney, Agent, or Firm* — Birch, Stewart, Kolasch & Birch, LLP

(57) ABSTRACT

A key input device includes: a display unit configured to display a keypad including one or more keys, the one or more keys having a plurality of characters and sequentially displaying the characters according to a rotation of the one or more keys; and a controller configured to display a selected one of characters displayed according to the rotation of the one or more keys on the display unit. Characters can be quickly and easily input via a touch screen.

34 Claims, 13 Drawing Sheets

(1)　　　(2)　　　(3)

(A) (B)

(C) (D)

KEY INPUT METHOD AND DEVICE THEREOF

This nonprovisional application claims priority under 35 U.S.C. §119(a) from Patent Application No. 10-2009-0024646 filed in the Republic of Korea on Mar. 23, 2009, the entire content of which is hereby incorporated by reference.

BACKGROUND OF THE INVENTION

1. Field of the Invention

The present invention relates to a key input method and its device.

2. Description of the Related Art

In general, a key input device of the related art mobile communication terminal allows a user to input various characters or symbols via a keypad or a touch screen.

SUMMARY OF THE INVENTION

According to an aspect of the invention, there is provided a key input device including: a display unit configured to display a keypad including one or more keys, the one or more keys having a plurality of characters and sequentially displaying the plurality of characters according to a rotation of the one or more keys; and a controller configured to display a selected one of the plurality of characters displayed according to the rotation of the one or more keys on the display unit.

According to another aspect of the invention, there is provided a key input device including: a display unit configured to display a keypad including one or more keys, the one or more keys having a plurality of English alphabet characters and sequentially displaying the English alphabet characters according to a rotation of the one or more keys; and a controller configured to display selected one of English alphabet characters displayed according to the rotation of the one or more keys on the display unit.

According to still another aspect of the invention, there is provided a key input device including: a display unit configured to display a keypad including one or more keys, the one or more keys having a plurality of Korean Hangul vowels or consonants and sequentially displaying the Korean Hangul vowels or consonants according to a rotation of the one or more keys; and a controller configured to display a letter formed by combining a vowel and a consonant selected from the consonants and vowels displayed according to the rotation of the one or more keys on the display unit.

According to another aspect of the invention, there is provided a key input method including: displaying a keypad including one or more keys, the one or more keys having a plurality of characters and sequentially displaying the plurality of characters according to a rotation of the one or more keys; and displaying a selected one of characters displayed according to the rotation of the one or more keys.

According to another aspect of the invention, there is provided a key input method including: displaying a keypad including one or more keys, the one or more keys having a plurality of English alphabet characters and sequentially displaying the English alphabet characters according to a rotation of the one or more keys; and displaying a selected one of the English alphabet character displayed according to the rotation of the one or more keys.

According to another aspect of the invention, there is provided a key input method including: displaying a keypad including one or more keys, the one or more keys having a plurality of Korean Hangul vowels or consonants and sequentially displaying the Korean Hangul vowels or consonants according to a rotation of the one or more keys; and displaying a letter formed by combining a vowel and a consonant selected from the consonants and vowels displayed according to the rotation of the one or more keys on the display unit.

The foregoing and other objects, features, aspects and advantages of the present invention will become more apparent from the following detailed description of the present invention when taken in conjunction with the accompanying drawings.

DETAILED DESCRIPTION OF THE INVENTION

A key input method and device allowing quick and easy input of characters via a touch screen according to example embodiments of the present invention will now be described with reference to the accompanying drawings.

Figure 1:
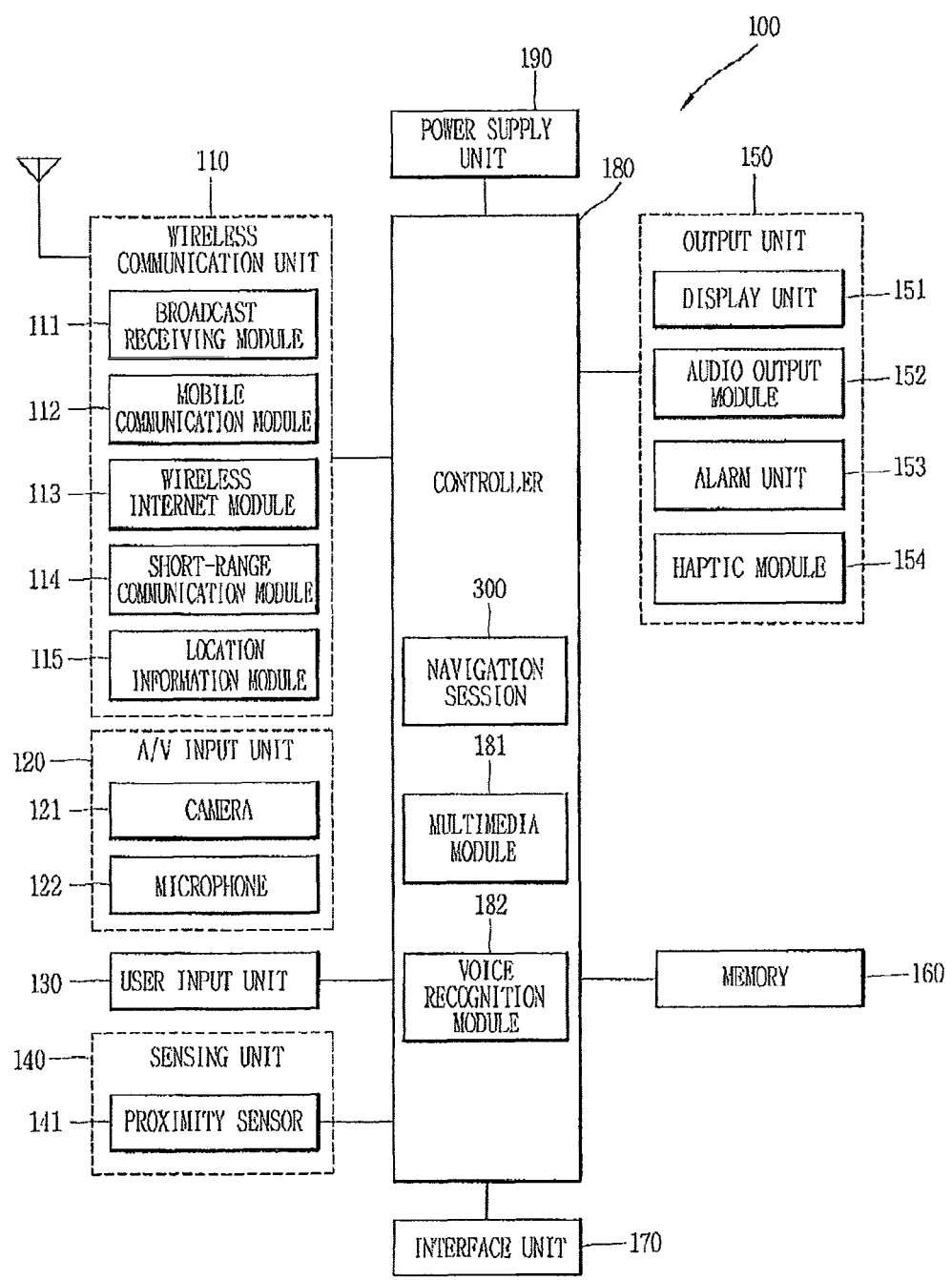
FIG. 1 is a schematic block diagram showing a configuration of a mobile communication terminal employing a key input device according to an embodiment of the present invention.

FIG. 1 is a schematic block diagram showing a configuration of a mobile communication terminal employing a key input device according to an embodiment of the present invention. The mobile communication terminal (mobile phone) 100 may be implemented in various forms. For example, the mobile terminal 100 described in the present invention may include mobile phones, smart phones, notebook computers, digital broadcast terminals, PDAs (Personal Digital Assistants), PMPs (Portable Multimedia Player), and the like.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal 100 is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal 100. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal 100 according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal 100.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal 100. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 includes a proximity sensor 141.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal 100 and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154 and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal 100 may include both an external display unit (not shown) and an internal display unit (not shown).

Meanwhile, when the display unit 151 and the touch pad are overlaid in a layered manner to form a touch screen, the display unit 151 may function as both an input device and an output device. The touch sensor may have, for example, a form of a touch film, a touch sheet, a touch pad, and the like. The touch sensor may be configured to convert a change in pressure applied to a particular portion of the display unit 151 or capacitance generated at a particular portion of the display unit 151 into an electrical input signal. The touch screen may be configured to detect a touch input pressure as well as a touch input position and a touch input area. When there is a touch input with respect to the touch sensor, a corresponding signal(s) is sent to a touch controller (not shown). The touch controller processes the signal(s) and transmits corresponding data to the controller 180. Accordingly, the controller 180 can recognize which portion of the display unit 151 has been touched.

Thus, although a pointer is not actually brought into contact with the touch screen but merely positioned close to the touch screen, the position of the pointer and the distance between the pointer and the touch screen can be detected. In the following description, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen. By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted. Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. For example, the haptic module 154 may be provided at a steering wheel, a gear shift lever, a seat of a car, and the like.

The memory 160 may store programs used for the processing and controlling operations performed by the controller 180, or may temporarily store data (e.g., a phonebook, messages, still images, video, etc.) that are inputted or outputted. The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various information for authenticating the authority of using the mobile terminal 100, and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the mobile terminal 100 via a port.

The interface unit 170 may receive data or power from an external device and transfer the same to each element within the mobile terminal 100, or transmit internal data of the mobile terminal 100 to an external device. When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal 100 therethrough. Various command signals or power inputted from the cradle may operate as signals for recognizing that the mobile terminal 100 is properly mounted on the cradle.

The controller 180 typically controls the general operations of the mobile terminal 100. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively. The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180. The voice recognition module 182 recognizes a voice generated by the user and performs a corresponding function according to the recognized voice signal.

The key input device applied to the mobile communication terminal 100 according to an embodiment of the present invention includes a display unit (e.g., a touch screen display 151) configured to display a keypad including one or more keys having English alphabet or Hangul characters (e.g., a plurality of vowels and/or consonants) and sequentially displaying the English alphabet or Hangul characters while being rotated; and a controller 180 configured to display a selected one of an English alphabet or a Hangul character displayed according to the rotation of the keys on the touch screen display.

Figure 2:
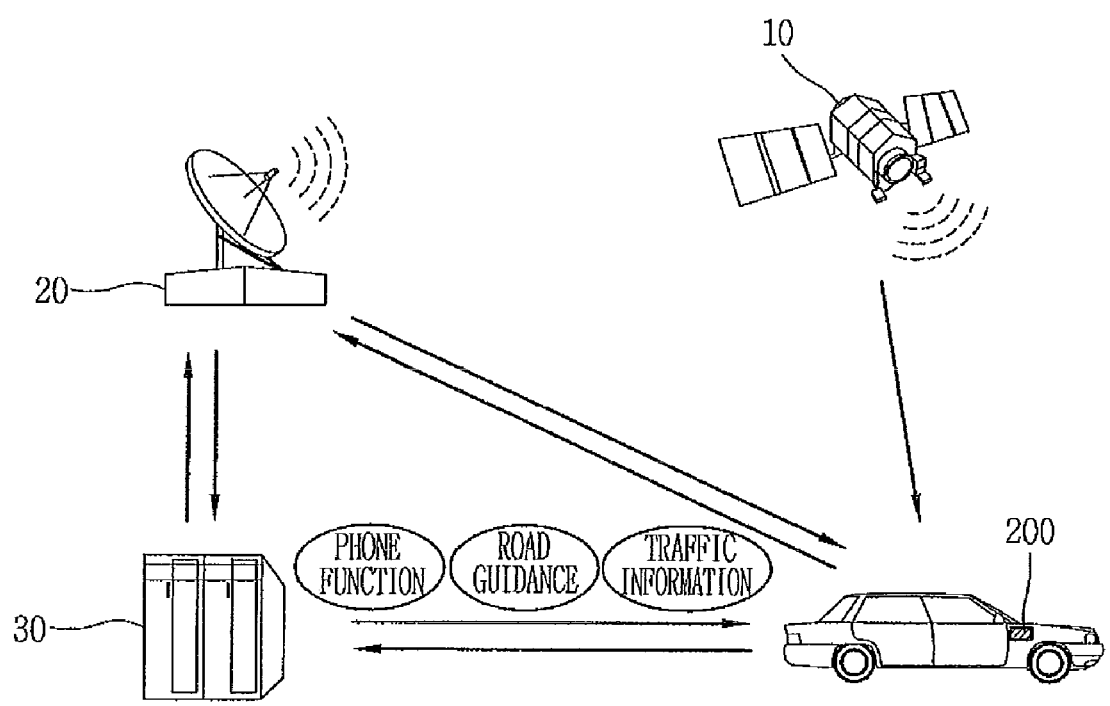
FIG. 2 is a schematic block diagram showing a vehicle navigation system for explaining a telematics terminal employing the key input device according to an embodiment of the present invention.

FIG. 2 is a schematic block diagram showing a vehicle navigation system for explaining a telematics terminal employing the key input device according to an embodiment of the present invention. As shown in FIG. 2, the vehicle navigation system includes; an information providing center 30 that provides traffic information and various data (e.g., a program, an executed file, etc.); and a telematics terminal 200 which is mounted within a vehicle, receives traffic information via a remote wireless communication network 20 and/or short-range wireless communication network, and provides a road guidance service based on a GPS signal received via an artificial satellite 10 and the traffic information. The configuration of the telematics terminal 200 employing the key input device according to an embodiment of the present invention will now be described with reference to FIG. 3.

Figure 3:
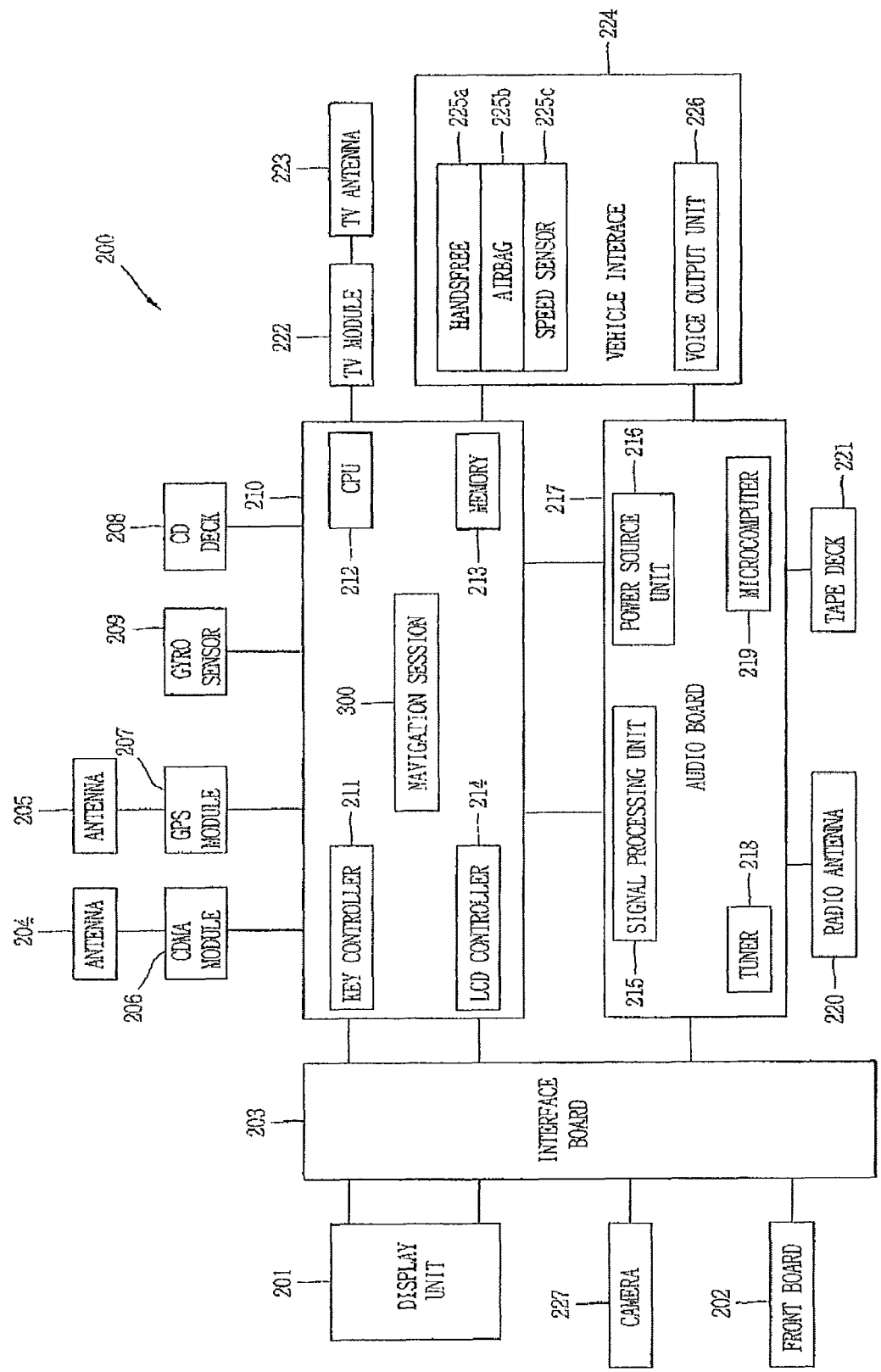
FIG. 3 is a schematic block diagram showing a configuration of the telematics terminal employing the key input device according to an embodiment of the present invention.

FIG. 3 is a schematic block diagram showing the configuration of the telematics terminal employing the key input device according to an embodiment of the present invention. As shown in FIG. 3, the telematics terminal 200 includes a main board 210 including a central processing unit (CPU) 212 for controlling the telematics terminal 200 overall, a memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The main board 210 includes a CDMA module 206, a mobile terminal having a unique device number as assigned and installed in the vehicle, a GPS module 207 for receiving a GPS signal for guiding the location of the vehicle or tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 transmit/receive signals via antennas 204 and 205.

A broadcast receiving module 222 is connected with the main board 210 and receives a broadcast signal via an antenna 223. A display unit (LCD) 201 under the control of the LCD controller 214, a front board 202 under the control of the key controller 211, and a camera 227 for capturing images of the interior and/or exterior of the vehicle are connected to the main board 210 via an interface board 203. The display unit 201 displays various video signals and character signals, and the front board 202 includes buttons for various key signal inputs and provides a key signal corresponding to a button selected by the user to the main board 210. The display unit 201 includes a proximity sensor and a touch sensor (touch screen) of FIG. 2. The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals. The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (i.e., amplifier) 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212. A navigation session 300 applied to the telematics terminal 200 generates road guidance information based on the map data and current location information of the vehicle and provides the road guidance information to a user.

The display unit 201 detects a proximity touch within a display window via a proximity sensor. For example, when a pointer (e.g., user's finger or stylus) closes in or closely touches the display unit 201, the display unit 201 detects the position of the proximity touch and outputs position information corresponding to the detected position to the controller 212. The display unit 201 may be a touch screen. The voice recognition device (or voice recognition module 301) may recognize a voice generated by the user and performs a corresponding function according to the recognized voice signal.

The key input device applied to the mobile communication terminal 200 according to an embodiment of the present invention includes a display unit (e.g., a touch screen display 201) configured to display a keypad including one or more keys having English alphabet and Hangul characters (e.g., a plurality of vowels and/or consonants) and sequentially displaying the English alphabet or Hangul characters while being rotated; and a controller 212 configured to display a selected one of an English alphabet or a Hangul character displayed according to the rotation of the keys on the touch screen display.

The configuration of the key input device according to an embodiment of the present invention will now be described with reference to FIG. 4. Here, the key input device in FIG. 4 may be applicable to various terminals using a key input device such as smart phones, notebook computers, PDAs, and PMPs, as well as to the mobile communication terminal 100 and the telematics terminal 200.

Figure 4:
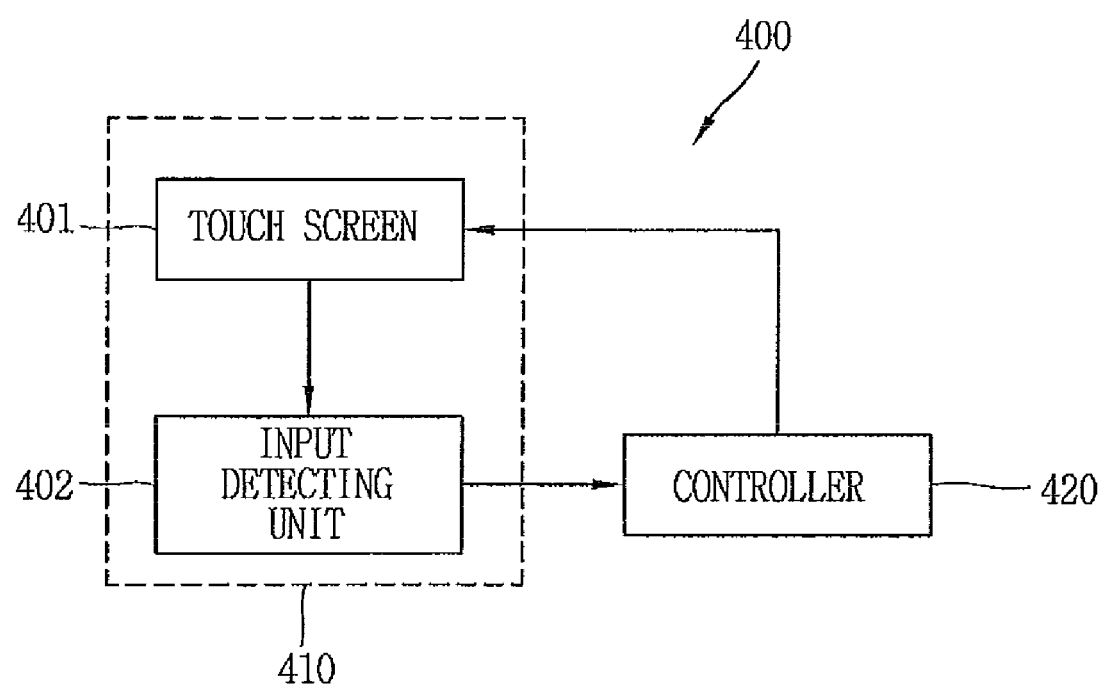
FIG. 4 is a schematic block diagram showing the configuration of a key input device according to a first embodiment of the present invention.

FIG. 4 is a schematic block diagram showing the configuration of a key input device 400 according to a first embodiment of the present invention. As shown in FIG. 4, the key input device 400 according to the first embodiment of the present invention includes: a display unit (or a touch screen display) 410 including a touch screen 401 configured to display a keypad including one or more keys having (or corresponding to) a plurality of characters (e.g., a plurality of vowels or consonants) and sequentially displaying the vowels or consonants while being rotated, and an input detecting unit 402 configured to detect a touch with respect to the keypad and informing that a corresponding key has been pressed; and a controller 420 configured to display a character (e.g., one syllable) by combining selected consonant and vowel based on the key input notification from the input detecting unit 402. Here, the touch screen 401 and the input detecting unit 402 may be independently configured or integrally configured in the display unit 410.

When a vowel or consonant displayed according to a rotation of the keys is contact-touched or closely touched, the controller 420 displays a character on the display unit 410, correspondingly, or by combining touched consonant and vowel. Here, the display unit 410 may be a touch screen display for detecting the contact touch with respect to the keys or a proximity sensor for detecting a proximity touch (or closely touched) with respect to the keys.

As the keys are dragged up/down/left/right by the user, the controller 420 rotates the key up/down/left/right in the display unit 410, for example, graphically. At this time, the controller 420 sequentially displays the plurality of vowels or consonants included in the keys on the keys. Here, the keys may further include symbols or numbers as well as the vowels and/or consonants. The keys may also include icons or other graphics.

The controller 420 may display the keys in one shape of a cubical sphere, cubical triangle, cubical quadrangle, cubical polygon, a polyhedron, or other shapes that can be three dimensionally represented, or any combination thereof. Additionally, all of the keys need not be of the same shape when displayed. Rather, if a plurality of keys are simultaneously displayed or used, the one or more of the keys may have different shapes. A designer, a user, or anyone may variably modify and implement the shapes of the keys based on the technical idea of the present invention. Herein, reference to the key being dragged includes the key being fixed in place, but moved relative to one or more axes. For example, if the key is a polyhedron or a sphere, the key is spun in place. Additionally, reference to the controller 420 rotating the key includes the controller 420 representing the key as being rotated.

When the keys are dragged, the controller 420 may sequentially display characters, such as the vowels or consonants, within the range of the keys. Namely, when the keys are dragged from fixed positions at which the keys are displayed, the controller 420 rotates the keys in the same direction as the drag direction. In addition, the controller 420 displays different characters, such as vowels or consonants, on the keys according to rotation direction of the keys. Herein, reference to vowels and/or consonants includes referring to any character.

The controller 420 may display characters, letters, or scripts of languages of any or all countries of the world, such as Japanese, German, French and Spanish, as well as English alphabet and Korean Hangul characters.

Figure 5:
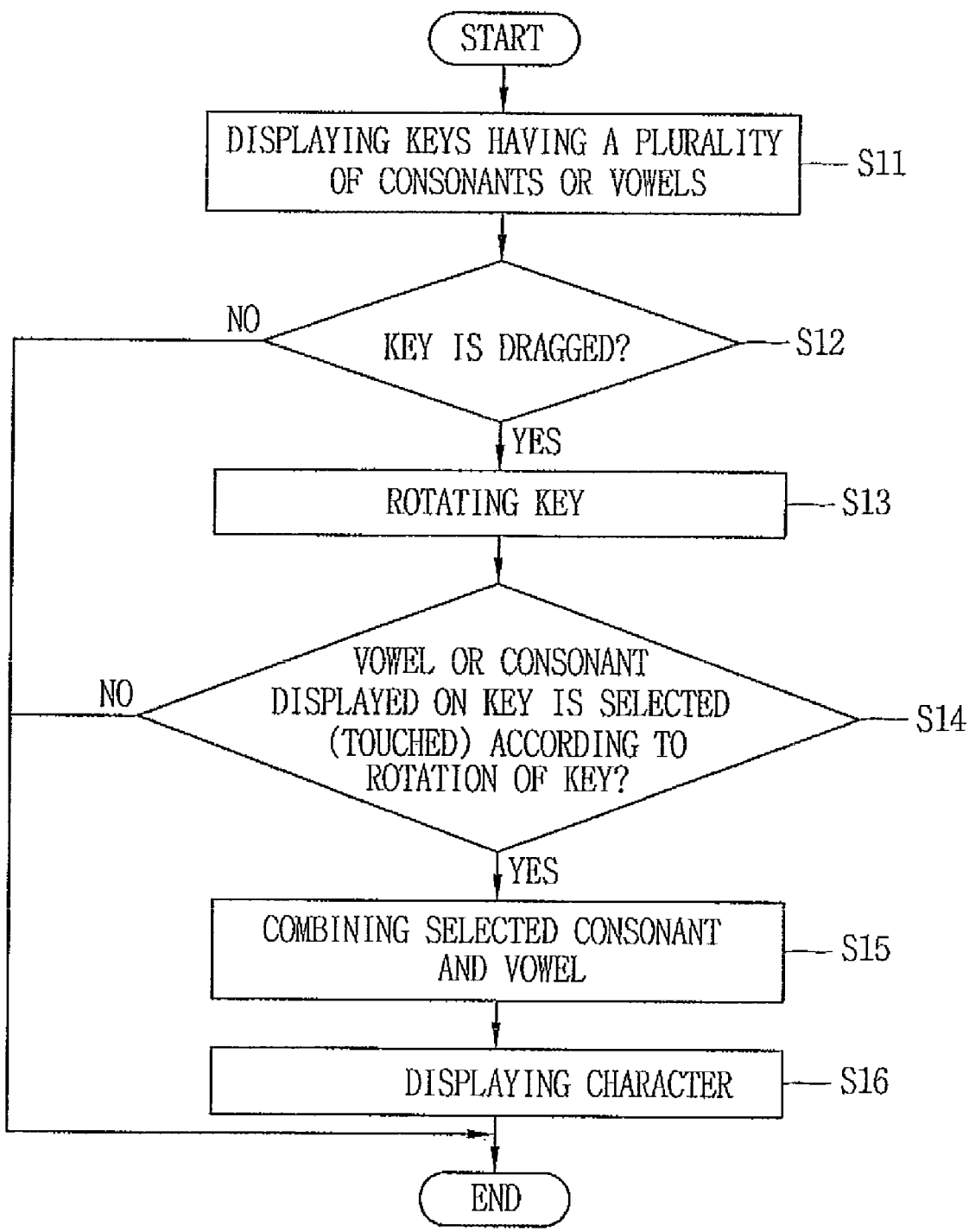
FIG. 5 is a flow chart illustrating a key input method according to the first embodiment of the present invention.

A key input method according to an embodiment of the present invention will now be described with reference to FIG. 5. FIG. 5 is a flow chart illustrating a key input method according to the first embodiment of the present invention. In this embodiment, use of Korean Hangul characters or script will be explained as a non-limiting example.

First, the display unit 410 displays one or more keys including a plurality of vowels and consonants and sequentially displays vowels and consonants while being rotated (S11). Here, a keypad may include one or more keys, may be configured with 12 keys, or greater or fewer keys then the 12 keys. The controller 420 determines whether a particular key (e.g., a key displaying ㄱ, ㅋ, ㄲ) among the keys of the keypad has been dragged by the user (S12).

The controller 420 sequentially displays the plurality of vowels and consonants, included in the key, on the key while rotating the key up/down/left/right along a drag direction (S13). For example, when the key is dragged in an upward direction by the user, the controller 420 displays ㄱ, ㅋ, ㄲ in turn while rotating the key in the upward direction. When the key is dragged in a downward direction by the user, the controller 420 displays ㄱ, ㅋ, ㄲ in turn while rotating the key in the downward direction. If the key is dragged in the leftward direction by the user, the controller 420 may display ㄱ, ㅋ, ㄲ in turn while rotating the key in the leftward direction, or sequentially display only particular consonants (e.g., ㄱ, ㄲ). If the key is dragged in the rightward direction by the user, the controller 420 may display ㄱ, ㅋ, ㄲ in turn while rotating the key in the rightward direction, or sequentially display only particular consonants (e.g., ㄱ, ㄲ).

Here, the single key may include a vowel as well as a consonant. For example, when the single key is dragged in the upward or downward direction by the user, the controller may display consonants while rotating the key in the upward or downward direction. When the single key is dragged in the leftward or rightward direction by the user, the controller may display vowels while rotating the key in the leftward or rightward direction. The number of vowels and/or consonants included in the single key may be set to be at least one or more by a designer, a user, or anyone.

Thereafter, the controller 420 determines whether or not one of the consonants or vowels displayed on the key is selected (via contact touch or proximity touch) (S14). For example, when one of the consonant or vowel displayed according to rotation of the key is selected, the display unit 410 outputs a detect signal indicating that the consonant or the vowel has been selected to the controller 420. Namely, when the key is dragged in the upward direction by the user, the display unit 410 displays ㄱ, ㅋ, ㄲ in turn while rotating the key in the upward direction, and when 'ㅋ' is clicked (one time click or double clicks) by the user, the controller 420 informs the controller 420 that 'ㅋ' has been selected. When the key is dragged in the leftward direction by the user, the controller 420 displays ㅏ, ㅗ, ㅡ in turn while rotating the key in the leftward direction, and when 'ㅏ' is clicked (one time click or double clicks) by the user, the display unit 410 informs the controller 420 that 'ㅏ' has been selected. Accordingly, the controller 420 can determine which one of the consonant or vowel displayed on the key has been selected (via contact touch or proximity touch).

The controller 420 combines the vowel and the consonant informed by the display unit 410 and displays the combined character on the display unit 410 (S15, S16). For example, the controller 420 combines 'ㄱ' and 'ㅏ' selected by the user to display '가'.. Here, the method of combining the consonant and vowel and displaying the character is a known art, so its detailed description will be omitted.

Hereinafter, a keypad including one or more keys having a plurality of vowels or consonants and sequentially displaying vowels or consonants while being rotated will now be described with reference to FIGS. 4 to 6.

Figure 6:
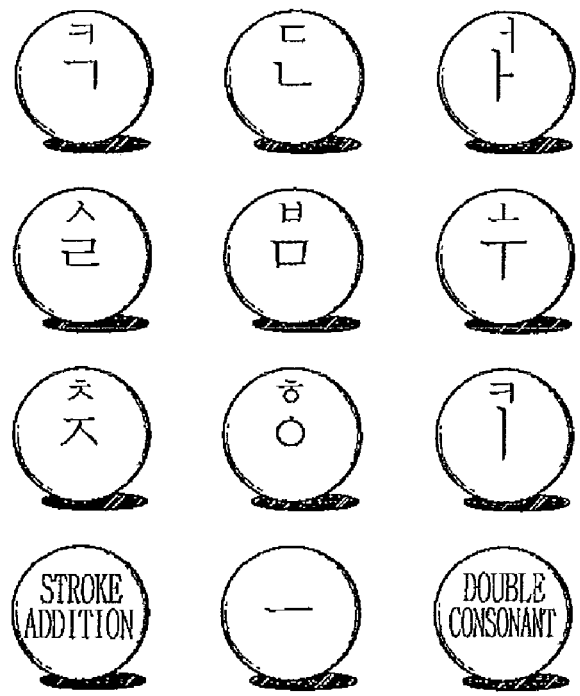
FIG. 6 illustrates a keypad according to the first embodiment of the present invention.

FIG. 6 illustrates a keypad according to the first embodiment of the present invention. As shown in FIG. 6, the keypad according to an embodiment of the present invention includes keys having a plurality of vowels and consonants and sequentially displaying vowels or consonants while being rotated. Also, the keypad may include a key for adding a stroke and a key for inputting double consonants, in addition to the keys including the vowels and consonants. The controller 420 may display the keys in the shape of a three-dimensional bead (or a circular shape).

The rotary keys according to an embodiment of the present invention will now be described with reference to FIGS. 4 to 7.

Figure 7:
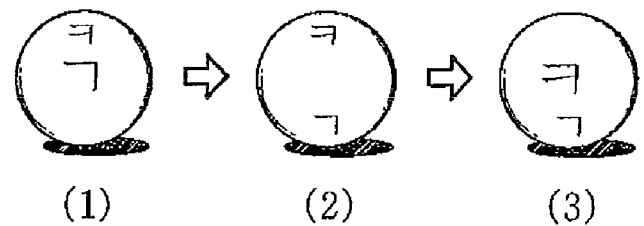
FIG. 7 illustrates rotating keys according to the first embodiment of the present invention.

FIG. 7 illustrates rotating of keys according to the first embodiment of the present invention. As shown in FIG. 7, when the user drags (or spins) a particular key, the controller 420 displays a vowel or a consonant on the particular key while rotating the particular key. For example, when the user drags the particular key with 'ㄱ' and 'ㅋ', the controller 420 displays 'ㄱ' and 'ㅋ' in turn while rotating the particular key in the order of (1), (2) and (3). Here, when ''ㄱ'' is positioned at the center of the particular key, the controller 420 displays 'ㄱ' such that it is larger than 'ㅋ', and when 'ㅋ' is displayed at the center of the particular key while the particular key is being rotated, the controller 420 displays 'ㅋ' to be larger than 'ㄱ'..

When 'ㄱ' is positioned at the center of the particular key, the controller 420 may display 'ㄱ' in a different color from the letter 'ㅋ'.. For example, when 'ㄱ' is positioned at the center of the particular key, the controller 420 may display the letter 'ㄱ' in red and 'ㅋ' in blue, and when 'ㅋ' is positioned at the center of the particular key, the controller 420 may display the letter 'ㅋ' in red and 'ㄱ' in blue. Here, the letters may be displayed in various colors by the designer, the user, or anyone. In addition to a difference in color, the letters may have a difference in transparency, clarity, size, font, movement or presentation, underlying, bolding, italics, or other distinguishing characteristics. For example, the character that is positioned at the center of the particular key may be more opaque, clear, and/or larger. Also, the character that is positioned at the center of the particular key may be may be blinking, underlined, bolder, and/or italicized. Accordingly, any way of distinguishing the character that is positioned at the center of the particular key is within the scope of the invention.

Hereinafter, a method for displaying a consonant or vowel corresponding to a key selected by the user on the display unit 410 according to an embodiment of the present invention will now be described with reference to FIGS. 4 and 8.

Figure 8:
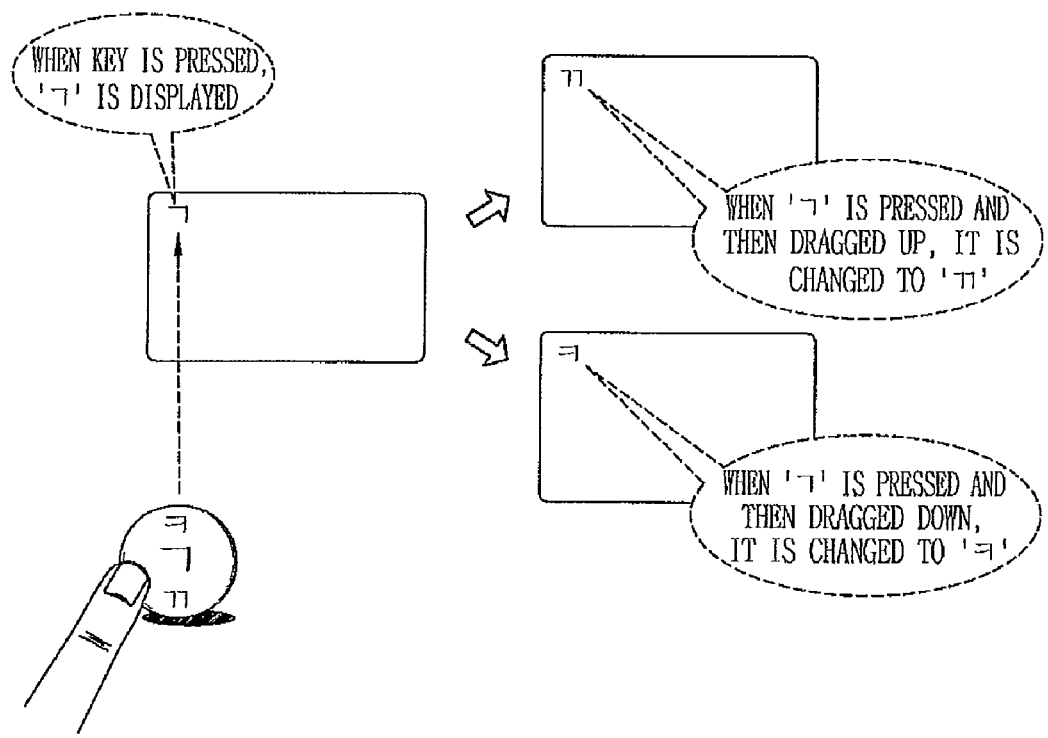
FIG. 8 illustrates a method of displaying a consonant or a vowel corresponding to a key selected by a user on a display unit according to the first embodiment of the present invention.

FIG. 8 illustrates a method of displaying a consonant or a vowel corresponding to a key selected by the user on the display unit according to the first embodiment of the present invention. As shown in FIG. 8, when the user clicks a particular key having 'ㄱ', 'ㅋ', 'ㄲ', the controller 420 displays 'ㄱ' at the center of the particular on the display unit 410. If the user clicks 'ㄱ' and then drags down the particular key, the controller 420 changes 'ㄱ' to 'ㄲ'. . At this time, after the particular key is dragged, if one of 'ㄱ', 'ㅋ', 'ㄲ' is clicked or double-clicked by the user, the controller 420 determines that the clicked or double-clicked consonant (e.g., 'ㄱ') (or vowel or other character) is selected, and displays the consonant on the display unit 410. Here, the consonant or vowel included in each key of the keypad may be one or three, but may be variably modified by the designer. After the particular key is dragged and the particular consonant or vowel, e.g., 'ㅋ', , is displayed, if there is not key input during a pre-set time period (e.g., three seconds), the controller 420 may automatically determine that ' 'ㅋ', ' is selected, and display the same on the display unit 410. When the particular key is dragged, the controller 420 may display the letter (character) in red on the display unit 410, and when the letter in red is selected (clicked) by the user, the controller 420 may display the selected letter in black. The color of the character may be variably changed by the designer or the user.

Hereinafter, the vowels and consonants included in the keys according to the first embodiment of the present invention will now be described with reference to FIGS. 4 and 9.

Figure 9:
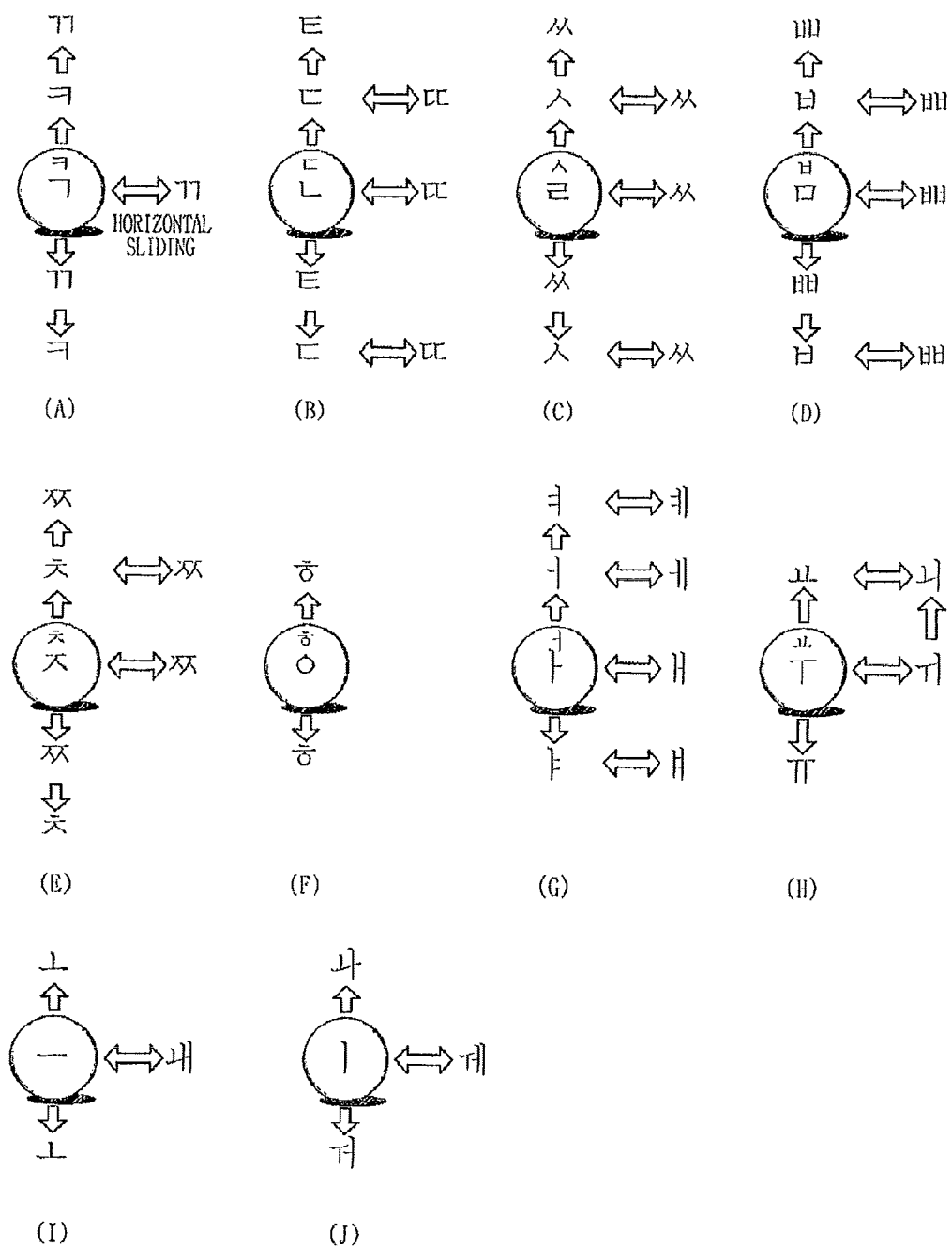
FIG. 9 illustrates vowels and consonants included in keys according to the first embodiment of the present invention.

FIG. 9 illustrates vowels and consonants included in keys according to the first embodiment of the present invention. As shown in FIG. 9, a key shown at (A) includes 'ㄱ', 'ㅋ', 'ㄲ', and when the key shown at (A) is dragged up or down by the user, the controller 420 sequentially displays 'ㄱ', 'ㅋ', 'ㄲ' on the key shown at (A) by rotating the key (namely, the position of the key is fixed and the key is rotated at the fixed position, for example, about an axis). Here, when the key shown at (A) is dragged left or right by the user, the controller 420 may display 'ㄲ' on the key shown at (A) by rotating the key shown at (A) in the leftward or rightward direction. Namely, when the user rolls the key shown at (A) left and right, the double consonant is displayed.

Here, in inputting English alphabet, when the key shown at (A) is dragged in the leftward or rightward direction by the user, the controller 420 may display an upper case or a lower case on the key shown at (A) by rotating the key shown at (A) in the leftward or rightward direction.

A key shown at (B) includes 'ㄴ', 'ㄷ', 'ㅌ', 'ㄸ', and when the key shown at (B) is dragged up or down by the user, the controller 420 sequentially displays 'ㄴ', 'ㄷ', 'ㅌ', 'ㄸ' on the key shown at (B) by rotating the key (namely, the position of the key is fixed and the key is rotated at the fixed position, for example, about an axis). Here, when the key shown at (B) is dragged left or right by the user, the controller 420 may display 'ㄸ' on the key shown at (B) by rotating the key shown at (B) in the leftward or rightward direction.

A key shown at (C) includes 'ㄹ', 'ㅅ', 'ㅆ', and when the key shown at (C) is dragged up and down by the user, the controller 420 sequentially displays 'ㄹ', 'ㅅ', 'ㅆ' on the key shown at (C) by rotating the key (namely, the position of the key is fixed and the key is rotated at the fixed position, for example, about an axis). Here, when the key shown at (C) is dragged left or right by the user, the controller 420 may display ''ㅆ' ' on the key shown at (C) by rotating the key shown at (C) in the leftward or rightward direction. Namely, when the user rolls the key shown at (C) left and right, the double consonant is displayed.

A key shown at (D) includes 'ㅁ', 'ㅂ', 'ㅃ', and when the key shown at (D) is dragged up and down by the user, the controller 420 sequentially displays 'ㅁ', 'ㅂ', 'ㅃ', on the key shown at (D) by rotating the key (namely, the position of the key is fixed and the key is rotated at the fixed position, for example, about an axis). Here, when the key shown at (D) is dragged left or right by the user, the controller 420 may display 'ㅃ' on the key shown at (D) by rotating the key shown at (D) in the leftward or rightward direction.

A key shown at (E) includes 'ㅈ', 'ㅊ', 'ㅉ', and when the key shown at (E) is dragged up and down by the user, the controller 420 sequentially displays 'ㅈ', 'ㅊ', 'ㅉ', on the key shown at (E) by rotating the key (namely, the position of the key is fixed and the key is rotated at the fixed position, for example, about an axis). Here, when the key shown at (E) is dragged left or right by the user, the controller 420 may display 'ㅉ' on the key shown at (E) by rotating the key shown at (E) in the leftward or rightward direction.

A key shown at (F) includes 'ㅇ', 'ㅎ', and when the key shown at (F) is dragged up and down by the user, the controller 420 sequentially displays 'ㅇ', 'ㅎ', on the key shown at (F) by rotating the key (namely, the position of the key is fixed and the key is rotated at the fixed position, for example, about an axis).

A key shown at (G) includes 'ㅏ', 'ㅓ', 'ㅕ', 'ㅑ', 'ㅐ', 'ㅒ', 'ㅔ', 'ㅖ', and when the key shown at (G) is dragged up and down by the user, the controller 420 sequentially displays 'ㅏ', 'ㅓ', 'ㅕ', 'ㅑ' on the key shown at (G) by rotating the key (namely, the position of the key is fixed and the key is rotated at the fixed position for example, about an axis). Here, when the key shown at (G) is dragged left or right by the user, the controller 420 may sequentially display 'ㅐ', 'ㅒ', 'ㅔ', 'ㅖ' on the key shown at (G) by rotating the key shown at (G) in the leftward or rightward direction.

A key shown at (H) includes 'ㅜ', 'ㅗ', 'ㅠ', 'ㅛ', 'ㅢ', and when the key shown at (H) is dragged up and down by the user, the controller 420 sequentially displays 'ㅜ', 'ㅗ', 'ㅠ' on the key shown at (H) by rotating the key (namely, the position of the key is fixed and the key is rotated at the fixed position, for example, about an axis). Here, when the key shown at (H) is dragged left or right by the user, the controller 420 may sequentially display 'ㅟ', 'ㅚ' on the key shown at (H) by rotating the key shown at (H) in the leftward or rightward direction.

A key shown at (I) includes 'ㅡ', 'ㅘ', 'ㅙ', and when the key shown at (I) is dragged up and down by the user, the controller 420 sequentially displays 'ㅡ', 'ㅘ' on the key shown at (I) by rotating the key (namely, the position of the key is fixed and the key is rotated at the fixed position, for example, about an axis). Here, when the key shown at (I) is dragged left or right by the user, the controller 420 may display 'ㅙ' on the key shown at (I) by rotating the key shown at (I) in the leftward or rightward direction.

A key shown at (J) includes 'ㅣ', 'ㅘ', 'ㅖ', and when the key shown at (J) is dragged up and down by the user, the controller 420 sequentially displays 'ㅣ', 'ㅘ' on the key shown at (J) by rotating the key (namely, the position of the key is fixed and the key is rotated at the fixed position, for example, about an axis). Here, when the key shown at (J) is dragged left or right by the user, the controller 420 may display 'ㅖ' on the key shown at (J) by rotating the key shown at (J) in the leftward or rightward direction.

Here, the number of vowels and consonants included in the keys A to J may be varied by the designer, or vowels and consonants may be variably mixed to be configured. One or more of the keys A to J may further include support letters. Namely, when a consonant is to be inputted as a support in due order, a double support may be added to the corresponding key. The method of inputting a support letter will now be described with reference to FIGS. 4 to 10, especially FIGS. 4 and 10.

Figure 10:
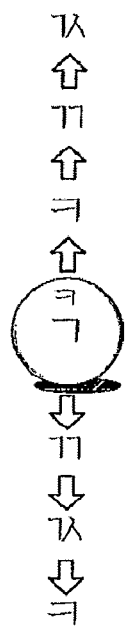
FIG. 10 illustrates keys including final consonants (consonant cluster) according to a second embodiment of the present invention.
Figure 10:
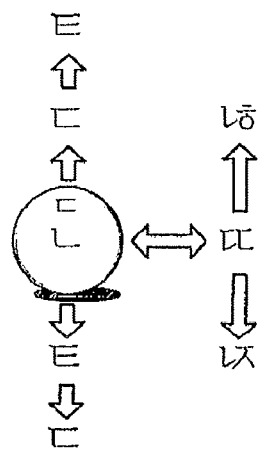
Figure 10:
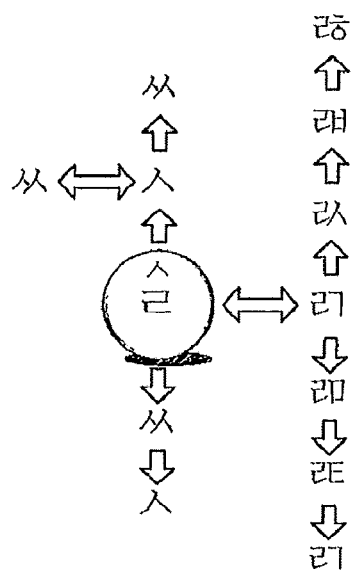
Figure 10:
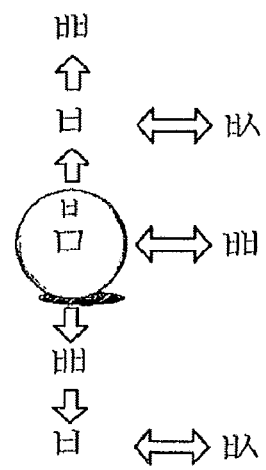

FIG. 10 illustrates keys including final consonants (consonant cluster) according to a second embodiment of the present invention. As shown in FIG. 10, a key shown at (A) includes 'ㄱ', 'ㅋ', 'ㄲ', 'ㄱㅅ' and when the key shown at (A) is dragged up or down by the user, the controller 420 sequentially displays 'ㄱ', 'ㅋ', 'ㄲ', 'ㄱㅅ' on the key shown at (A) by rotating the key (namely, the position of the key is fixed and the key is rotated at the fixed position, for example, about an axis). Here, when the key shown at (A) is dragged left or right by the user, the controller 420 may sequentially display 'ㄲ', 'ㄱㅅ' on the key shown at (A) by rotating the key shown at (A) in the leftward or rightward direction. In addition, when a support letter is to be inputted in the order, the controller 420 may display 'ㄱㅅ' on the key shown at (A).

A key shown at (B) includes 'ㄴ', 'ㄷ', 'ㅌ', 'ㄸ', 'ㄴㅎ', 'ㄴㅈ' and when the key shown at (B) is dragged up or down by the user, the controller 420 sequentially displays 'ㄴ', 'ㄷ', 'ㅌ', 'ㄸ' on the key shown at (B) by rotating the key (namely, the position of the key is fixed and the key is rotated at the fixed position, for example, about an axis). Here, when the key shown at (B) is dragged left or right by the user, the controller 420 may sequentially display 'ㄸ', 'ㄴㅎ', 'ㄴㅈ' on the key shown at (B) by rotating the key shown at (B) in the leftward or rightward direction. In addition, when a support letter is to be inputted in the order, the controller 420 may display 'ㄴㅎ', 'ㄴㅈ' on the key shown at (B).

A key shown at (C) includes 'ㄹ', 'ㅅ', 'ㅆ', 'ㄹㄱ', 'ㄹㅅ', 'ㄹㅂ', 'ㄹㅎ', 'ㄹㅁ', 'ㄹㅌ' and when the key shown at (C) is dragged up or down by the user, the controller 420 sequentially displays 'ㄹ', 'ㅅ', 'ㅆ' on the key shown at (C) by rotating the key (namely, the position of the key is fixed and the key is rotated at the fixed position, for example, about an axis). Here, when the key shown at (C) is dragged left or right by the user, the controller 420 may sequentially display 'ㄹㄱ', 'ㄹㅅ', 'ㄹㅂ', 'ㄹㅎ', 'ㄹㅁ', 'ㄹㅌ' on the key shown at (C) by rotating the key shown at (C) in the leftward or rightward direction. In addition, when a support letter is to be inputted in the order, the controller 420 may display 'ㄹㄱ', 'ㄹㅅ', 'ㄹㅂ', 'ㄹㅎ', 'ㄹㅁ', 'ㄹㅌ' on the key shown at (C).

A key shown at (D) includes 'ㅁ', 'ㅂ', 'ㅃ', 'ㅂㅅ' and when the key shown at (D) is dragged up or down by the user, the controller 420 sequentially displays 'ㅁ', 'ㅂ', 'ㅃ' on the key shown at (D) by rotating the key (namely, the position of the key is fixed and the key is rotated at the fixed position, for example, about an axis). Here, when the key shown at (D) is dragged left or right by the user, the controller 420 may display 'ㅂㅅ' on the key shown at (D) by rotating the key shown at (D) in the leftward or rightward direction. In addition, when a support letter is to be inputted in the order, the controller 420 may display 'ㅂㅅ' on the key shown at (D).

When a particular key is dragged in the left or right direction and then dragged up and down by the user, the controller may display the support letters on the particular key. For example, in the first and second embodiments of the present invention, when 'ㅙ' is to be inputted, the user may input 'ㅙ' by sequentially inputting 'ㅇ', 'ㅗ', 'ㅏ', 'ㅣ', or may input 'ㅙ' by sequentially inputting 'ㅇ', 'ㅗ', 'ㅐ', or may input 'ㅙ' by sequentially inputting 'ㅇ', 'ㅙ'.

Hereinafter, a method of rotating keys will now be described with reference to FIGS. 4 to 11, especially FIGS. 4 and 11.

Figure 11:
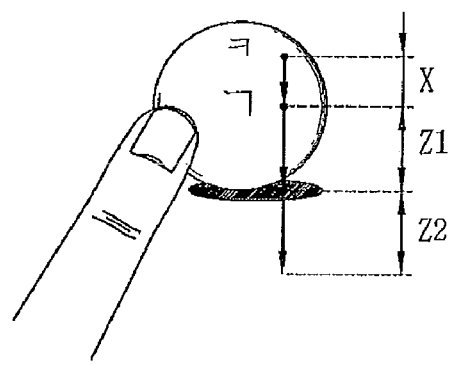
FIG. 11 illustrates a method of rotating a key according to a third embodiment of the present invention.

FIG. 11 illustrates a method of rotating a key according to a third embodiment of the present invention. As shown in FIG. 11, the controller 420 may rotate a key only when the user presses and moves the key by more than a pre-set distance in the pressed state. Namely, in order to restrict or prevent the key from being too sensitive and/or unintentionally rotated, the controller 420 may rotate the key one time only when the user drags the key by more than the pre-set distance in the pressed state. Here, whenever the key is rotated one time, the controller may sequentially display consonants or vowels previously set for the key.

For example, when the user drags a particular key (e.g., the key including 'ㄱ', 'ㅋ') by more than a 'x' distance, the controller 420 recognizes it as a key input and rotates the particular key. In addition, when the particular key is dragged by more than a Z1 distance, the controller 420 rotates the particular key one time to display the next consonant (e.g., 'ㅋ'). Meanwhile, if the particular key is not dragged by more than the Z1 distance, the controller 420 returns the particular key to its original state. Namely, if the particular key is dragged by more than the 'x' distance, the controller 420 recognizes it as a particular key input and rotates the particular key proportionally according to the drag speed (amount or distance), and if the particular key is dragged by more than the Z1 distance, the controller rotates the particular key one time to display the next consonant 'ㅋ'. Meanwhile, if the particular key is dragged by less than the Z1 distance, the controller 420 displays 'ㄱ' (namely, the controller returns the particular key to its original state). If the particular key is quickly dragged by more than a Z½ distance by the user, the controller 420 may rotate the particular key. Here, the controller 420 may adjust the rotation speed of the key inverse-proportionally or proportionally to the movement speed of Z1.

Meanwhile, when the user drags the particular key (e.g., the key including 'ㄱ', 'ㅋ' by more than a Z2 distance, the controller 420 may rotate the particular key two times and display a consonant or a vowel corresponding to the two-time rotation. For example, in a state that 'ㄱ' is displayed on the particular key (e.g., the key including 'ㄱ', 'ㅋ', ㄲ, if the particular key is dragged by the user by more than the Z2 distance, the controller 420 rotates the particular key two times and displays 'ㄲ' corresponding to the two-time rotation on the particular key.

A keypad including one or more keys having English alphabet and sequentially displaying the English alphabet while being rotated according to a fourth embodiment of the present invention will now be described with reference to FIGS. 4 to 12, especially FIGS. 4 and 12.

Figure 12:
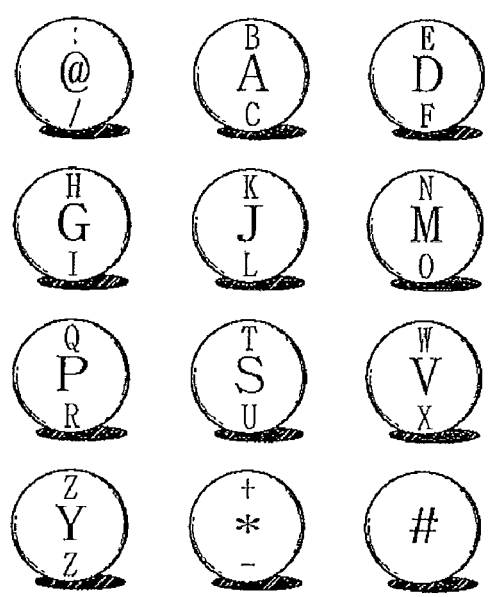
FIG. 12 illustrates a keypad according to a fourth embodiment of the present invention.

FIG. 12 illustrates a keypad according to a fourth embodiment of the present invention. As shown in FIG. 12, the keypad according to the fourth embodiment of the present invention includes keys having a plurality of English alphabet and sequentially displaying the English alphabet while being rotated. The keypad may further include keys for inputting special characters, symbols, and the like, such as ':', '@', '/', '*', '+', and '#' as well as the keys for English alphabet. The controller 420 may display various cubical figures as well as the three-dimensional bead (or circular) shape.

The keys including English alphabet and symbols (including special characters) according to the fourth embodiment of the present invention will now be described with reference to FIGS. 4 to 13, especially FIGS. 4 and 13.

Figure 13:
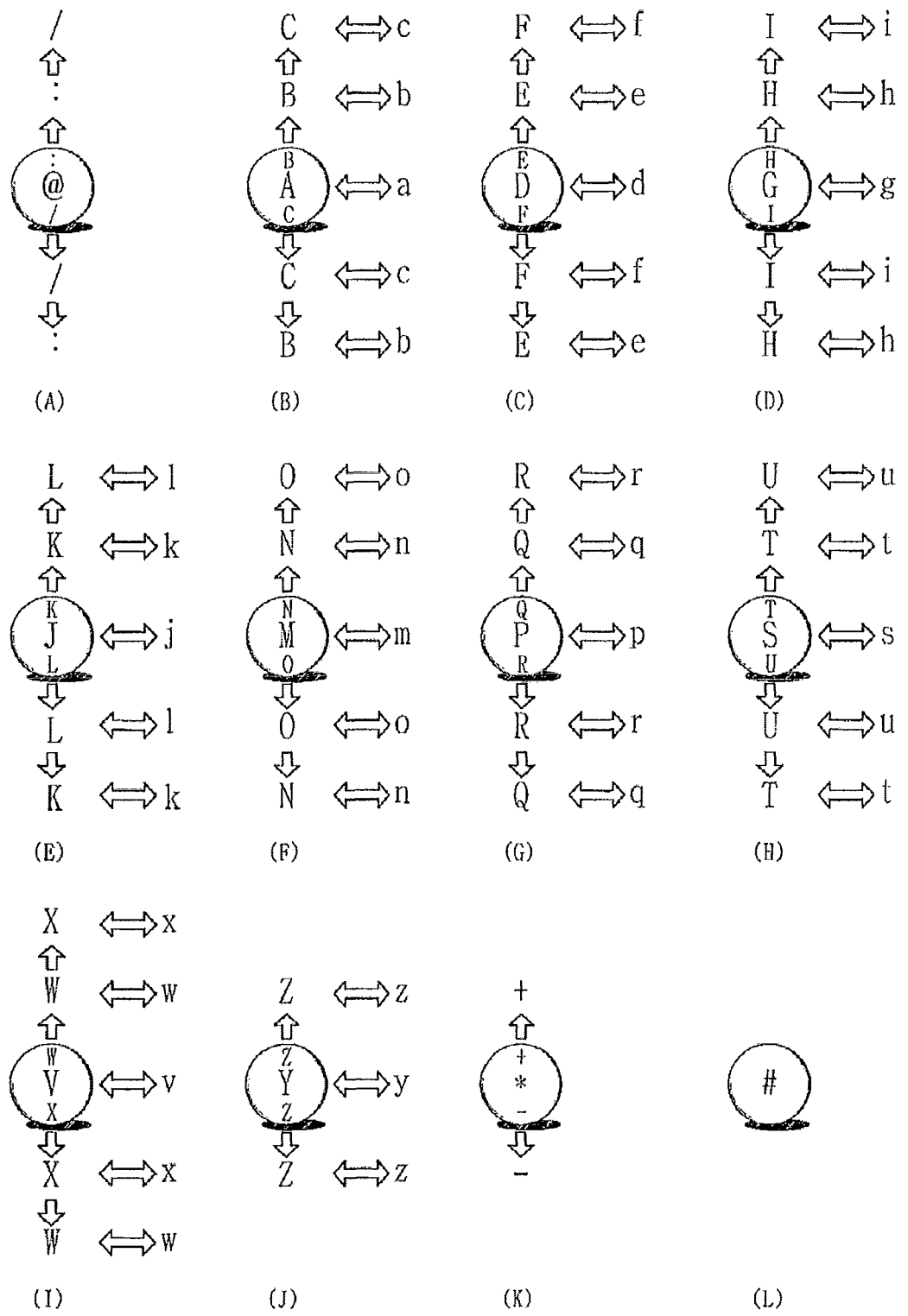
FIG. 13 illustrates English alphabet and symbols included in keys according to the fourth embodiment of the present invention.

FIG. 13 illustrates English alphabet and symbols included in keys according to the fourth embodiment of the present invention. As shown in FIG. 13, a key shown at (A) includes '@', ':', '/' and when the key shown at (A) is dragged up or down by the user, the controller 420 sequentially displays '@', ':', '/' on the key shown at (A) by rotating the key (namely, the position of the key is fixed and the key is rotated at the fixed position, for example, about an axis). Here, when the key shown at (A) is dragged left or right by the user, the controller 420 may sequentially display '@', ':', '/' on the key shown at (A) by rotating the key shown at (A) in the leftward or rightward direction.

A key shown at (B) includes 'A', 'B', 'C' and when the key shown at (B) is dragged up or down by the user, the controller 420 sequentially displays 'A', 'B', 'C' on the key shown at (B) by rotating the key (namely, the position of the key is fixed and the key is rotated at the fixed position, for example, about an axis). Here, when the key shown at (B) is dragged left or right by the user, the controller 420 may sequentially display 'A', 'B', 'C' as lower cases on the key shown at (B) by rotating the key shown at (B) in the leftward or rightward direction. For example, when 'A' is displayed on the key shown at (B) and dragged in the leftward or rightward direction by the user, the controller 420 rotates the key shown at (B) in the leftward or rightward direction to change 'A' to a lower case 'a'. When 'B' is displayed on the key shown at (B) and dragged in the leftward or rightward direction by the user, the controller 420 rotates the key shown at (B) in the leftward or rightward direction to change 'B' to a lower case 'b'. When 'C' is displayed on the key shown at (B) and dragged in the leftward or rightward direction by the user, the controller 420 rotates the key shown at (B) in the leftward or rightward direction to change 'C' to a lower case 'c'.

A key shown at (C) includes 'D', 'E', 'F' and when the key shown at (C) is dragged up or down by the user, the controller 420 sequentially displays 'D', 'E', 'F' on the key shown at (C) by rotating the key (namely, the position of the key is fixed and the key is rotated at the fixed position, for example, about an axis). Here, when the key shown at (C) is dragged left or right by the user, the controller 420 changes upper case alphabet into lower case alphabet by rotating the key shown at (C) in the leftward or rightward direction.

A key shown at (D) includes 'G', 'H', 'I' and when the key shown at (D) is dragged up or down by the user, the controller 420 sequentially displays 'G', 'H', 'I' on the key shown at (D) by rotating the key (namely, the position of the key is fixed and the key is rotated at the fixed position, for example, about an axis). Here, when the key shown at (D) is dragged left or right by the user, the controller 420 changes upper case alphabet into lower case alphabet by rotating the key shown at (D) in the leftward or rightward direction.

A key shown at (E) includes 'J', 'K', 'L' and when the key shown at (E) is dragged up or down by the user, the controller 420 sequentially displays 'J', 'K', 'L' on the key shown at (E) by rotating the key (namely, the position of the key is fixed and the key is rotated at the fixed position, for example, about an axis). Here, when the key shown at (E) is dragged left or right by the user, the controller 420 changes upper case alphabet into lower case alphabet by rotating the key shown at (E) in the leftward or rightward direction.

A key shown at (F) includes 'M', 'N', 'O' and when the key shown at (F) is dragged up or down by the user, the controller 420 sequentially displays 'M', 'N', 'O' on the key shown at (F) by rotating the key (namely, the position of the key is fixed and the key is rotated at the fixed position, for example, about an axis). Here, when the key shown at (F) is dragged left or right by the user, the controller 420 changes upper case alphabet into lower case alphabet by rotating the key shown at (F) in the leftward or rightward direction.

A key shown at (G) includes 'P', 'Q', 'R' and when the key shown at (G) is dragged up or down by the user, the controller 420 sequentially displays 'P', 'Q', 'R' on the key shown at (G) by rotating the key (namely, the position of the key is fixed and the key is rotated at the fixed position, for example, about an axis). Here, when the key shown at (G) is dragged left or right by the user, the controller 420 may sequentially display 'P', 'Q', 'R' on the key shown at (G) by rotating the key in the leftward or rightward direction. Here, when the key shown at (G) is dragged left or right by the user, the controller 420 changes upper case alphabet into lower case alphabet by rotating the key shown at (G) in the leftward or rightward direction.

A key shown at (H) includes 'S', 'T', 'U' and when the key shown at (H) is dragged up or down by the user, the controller 420 sequentially displays 'S', 'T', 'U' on the key shown at (H) by rotating the key (namely, the position of the key is fixed and the key is rotated at the fixed position, for example, about an axis). Here, when the key shown at (H) is dragged left or right by the user, the controller 420 changes upper case alphabet into lower case alphabet by rotating the key shown at (H) in the leftward or rightward direction.

A key shown at (I) includes 'V', 'W', 'X' and when the key shown at (I) is dragged up or down by the user, the controller 420 sequentially displays 'V', 'W', 'X' on the key shown at (I) by rotating the key (namely, the position of the key is fixed and the key is rotated at the fixed position, for example, about an axis). Here, when the key shown at (I) is dragged left or right by the user, the controller 420 changes upper case alphabet into lower case alphabet by rotating the key shown at (I) in the leftward or rightward direction.

A key shown at (J) includes 'Y', 'Z' and when the key shown at (J) is dragged up or down by the user, the controller 420 sequentially displays 'Y', 'Z' on the key shown at (J) by rotating the key (namely, the position of the key is fixed and the key is rotated at the fixed position, for example, about an axis). Here, when the key shown at (J) is dragged left or right by the user, the controller 420 changes upper case alphabet into lower case alphabet by rotating the key shown at (J) in the leftward or rightward direction.

A key shown at (K) includes '*', '+', '−' and when the key shown at (K) is dragged up or down by the user, the controller 420 sequentially displays '*', '+', '−' on the key shown at (K) by rotating the key (namely, the position of the key is fixed and the key is rotated at the fixed position, for example, about an axis).

A key shown at (L) includes '#' and when the key shown at (L) is clicked by the user, the controller 420 displays the clicked '#' on the display unit 410.

Here, when an upper case or a lower case is displayed on a particular key and dragged in a vertical or horizontal direction, the controller 420 may change the upper case into a lower case, or the lower case into an upper case. Namely, the controller 420 may change an upper case of an English alphabet into a lower case or a lower case into an upper case according to a rotation direction of the key. Either the upper case or the lower case may be a default. When character inputting is completed, the controller 420 automatically sets the key state of the keypad as an initial state.

Meanwhile, the keys according to the embodiments of the present invention may be displayed in various cubical figures. For example, the keys according to the embodiments of the present invention may be display in shapes including a rotational body such as cylinder, cone, sphere generated when a plane figure is rotated one time by using a straight line as an axis, a prism such as a square column, regular pentagonal column having two base sides which are parallel and congruent and the sides which have all rectangular form, a pyramid such as triangular pyramid, quadrangular pyramid and hexagonal pyramid having the base side which is polygonal and the sides are all triangular, a prismoid formed by cutting a pyramid into a plane parallel to the base side, and a regular polyhedron such as regular tetrahedron, regular hexahedron, regular octahedron, regular dodecahedron, regular icosahedron, and the like.

Hereinafter, the keys in the shapes of quadrangle, cylinder, quadrangular pyramid, or prismoid will now be described with reference to FIGS. 14 to 17, especially FIGS. 14 and 17.

Figure 14:
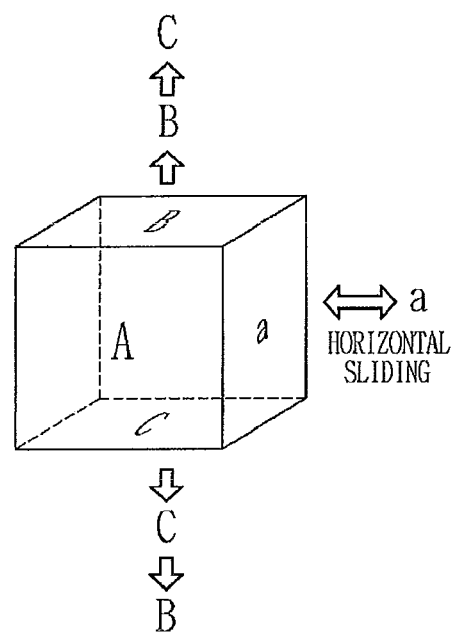
FIG. 14 illustrates a square key according to a fifth embodiment of the present invention.

FIG. 14 illustrates a square key according to a fifth embodiment of the present invention. As shown in FIG. 14, the controller 420 displays a quadrangular key on the display unit 410. The key shown in FIG. 14 includes 'A', 'B', 'C', and when the quadrangular key is dragged up or down by the user, the controller 420 sequentially displays 'A', 'B', 'C' on the key by rotating the key in an upward or downward direction (namely, the position of the key is fixed and the key is rotated at the fixed position, for example, about an axis). Here, when the key is dragged left or right by the user, the controller 420 display a lower case alphabet by rotating the key in the leftward or rightward direction. For example, when alphabet upper case 'A' is displayed on the key and dragged in the leftward or rightward direction by the user, the controller 420 rotates the key in the leftward or rightward direction to display its lower case 'a' on the key. When alphabet upper case 'B' is displayed on the key and dragged in the leftward or rightward direction by the user, the controller 420 rotates the key in the leftward or rightward direction to display its lower case 'b' on the key. When alphabet upper case 'C' is displayed on the key and dragged in the leftward or rightward direction by the user, the controller 420 rotates the key in the leftward or rightward direction to display its lower case 'c' on the key.

Here, the controller 420 may display Hangul characters (e.g., vowels and consonants) as well as English alphabet on the quadrangular key. In addition, the controller 420 may further display additional alphabet, symbols, and special characters, as well as 'A', 'B', 'C', on an empty space of the key in a square pillar shape.

In embodiments of the present invention, the English alphabet and the Korean Hangul characters may be used together in a key. For example, dragging the key up or down may change displayed English alphabet to one that is desired. Then, dragging the key to the right may change the desired English alphabet into its lower case, and dragging the key to the left may change the desired English alphabet into a phonetically equivalent (e.g., same sounding) Korean Hangul character. It is understood that such a translation of the language character may be used for any combination of different languages, characters, scripts, or even symbols without any meaning. With respect to translating a language character into symbols without meaning, a user, such as a child, may use the feature to create a text message using the symbols that appears to be random to someone else (e.g. a secret message), for fun.

Figure 15:
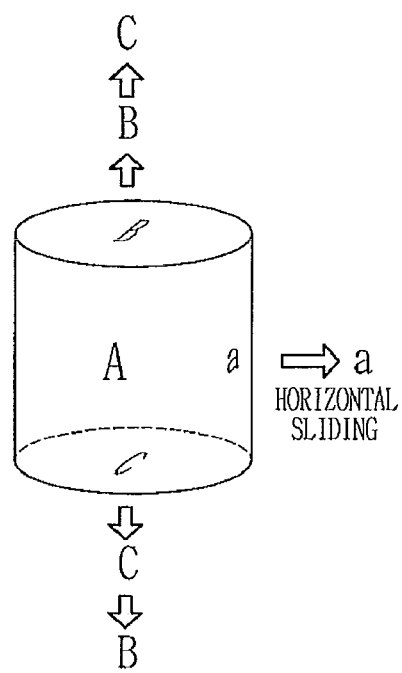
FIG. 15 illustrates a cylindrical key according to a sixth embodiment of the present invention.

FIG. 15 illustrates a cylindrical key according to a sixth embodiment of the present invention. As shown in FIG. 15, the controller 420 displays a cylindrical key on the display unit 410. The key shown in FIG. 15 includes 'A', 'B', 'C', and As shown in FIG. 15, the controller 420 displays the cylindrical key on the display unit 410. The key shown in FIG. 15 includes 'A', 'B', 'C', and when the cylindrical key is dragged up or down by the user, the controller 420 sequentially displays 'A', 'B', 'C' on the key by rotating the key in an upward or downward direction (namely, the position of the key is fixed and the key is rotated at the fixed position, for example, about an axis). Here, when the key is dragged left or right by the user, the controller 420 display a lower case alphabet by rotating the key in the leftward or rightward direction. For example, when alphabet upper case 'A' is displayed on the key and dragged in the leftward or rightward direction by the user, the controller 420 rotates the key in the leftward or rightward direction to display its lower case 'a' on the key. When alphabet upper case 'B' is displayed on the key and dragged in the leftward or rightward direction by the user, the controller 420 rotates the key in the leftward or rightward direction to display its lower case 'b' on the key. When alphabet upper case 'C' is displayed on the key and dragged in the leftward or rightward direction by the user, the controller 420 rotates the key in the leftward or rightward direction to display its lower case 'c' on the key.

Here, the controller 420 may display Hangul characters (e.g., vowels and consonants) as well as English alphabet on the cylindrical key. In addition, the controller 420 may further display additional alphabets, symbols, and special characters, as well as 'A', 'B', 'C', on an empty space of the cylindrical key.

Figure 16:
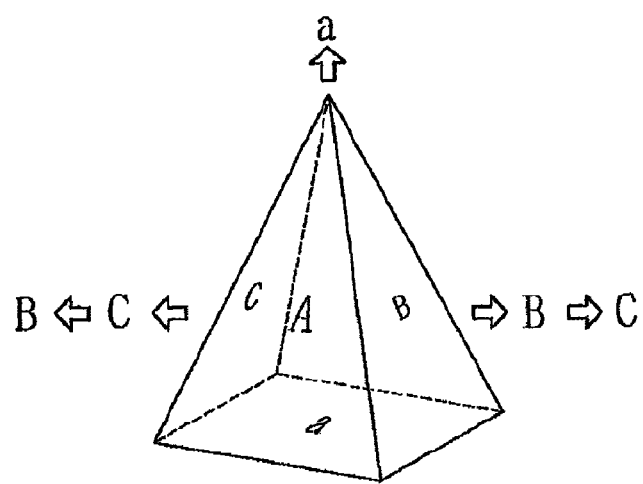
FIG. 16 illustrates a key in a quadrangular pyramid shape according to a seventh embodiment of the present invention.

FIG. 16 illustrates a key in a quadrangular pyramid shape according to a seventh embodiment of the present invention. As shown in FIG. 16, the controller 420 displays the key in the quadrangular pyramid shape on the display unit 410. The key shown in FIG. 16 includes 'A', 'B', 'C', and when the key in the quadrangular pyramid shape is dragged up or down by the user, the controller 420 sequentially displays 'A', 'B', 'C' on the key by rotating the key in an upward or downward direction (namely, the position of the key is fixed and the key is rotated at the fixed position, for example, about an axis). Here, when the key is dragged left or right by the user, the controller 420 display a lower case alphabet by rotating the key in the leftward or rightward direction. For example, when alphabet upper case 'A' is displayed on the key and dragged in the leftward or rightward direction by the user, the controller 420 rotates the key in the leftward or rightward direction to display its lower case 'a' on the key. When alphabet upper case 'B' is displayed on the key and dragged in the leftward or rightward direction by the user, the controller 420 rotates the key in the leftward or rightward direction to display its lower case 'b' on the key. When alphabet upper case 'C' is displayed on the key and dragged in the leftward or rightward direction by the user, the controller 420 rotates the key in the leftward or rightward direction to display its lower case 'c' on the key.

Here, the controller 420 may display Hangul characters (e.g., vowels and consonants) as well as English alphabet on the key in the quadrangular pyramid shape. In addition, the controller 420 may further display additional alphabets, symbols, and special characters, as well as 'A', 'B', 'C', on an empty space of the key in a quadrangular pyramid shape.

Figure 17:
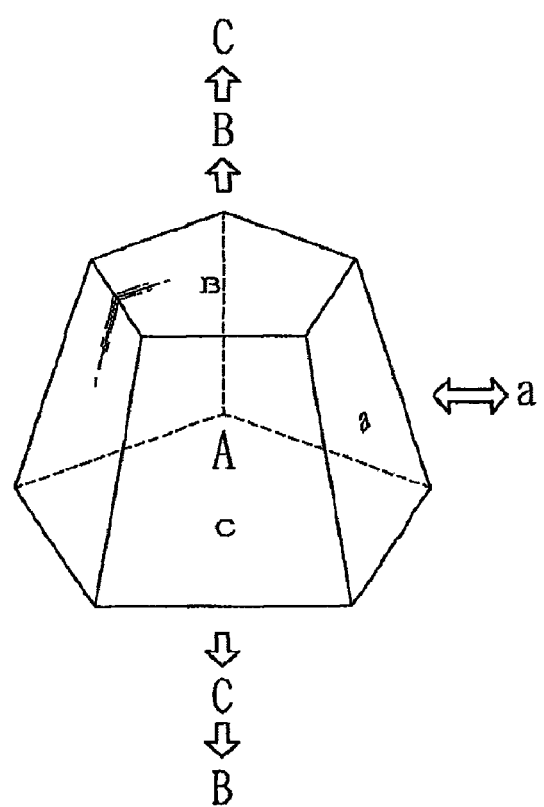
FIG. 17 illustrates a prismoid key according to an eighth embodiment of the present invention.

FIG. 17 illustrates a prismoid key according to an eighth embodiment of the present invention. As shown in FIG. 17, the controller 420 displays a prismoid key on the display unit 410. The key shown in FIG. 17 includes 'A', 'B', 'C', and when the prismoid key is dragged up or down by the user, the controller 420 sequentially displays 'A', 'B', 'C' on the key by rotating the key in an upward or downward direction (namely, the position of the key is fixed and the key is rotated at the fixed position, for example, about an axis). Here, when the key is dragged left or right by the user, the controller 420 display a lower case alphabet by rotating the key in the leftward or rightward direction. For example, when alphabet upper case 'A' is displayed on the key and dragged in the leftward or rightward direction by the user, the controller 420 rotates the key in the leftward or rightward direction to display its lower case 'a' on the key. When alphabet upper case 'B' is displayed on the key and dragged in the leftward or rightward direction by the user, the controller 420 rotates the key in the leftward or rightward direction to display its lower case 'b' on the key. When alphabet upper case 'C' is displayed on the key and dragged in the leftward or rightward direction by the user, the controller 420 rotates the key in the leftward or rightward direction to display its lower case 'c' on the key.

Also, when the prismoid key is dragged left and right by the user, the controller 420 may sequentially display 'A', 'B', 'C' on the key by rotating the key in the leftward or rightward direction (namely, the position of the key is fixed and the key is rotated at the fixed position, for example, about an axis). Here, when an alphabet upper case is displayed on the key and the key is then dragged up or down by the user, the controller 420 may display its alphabet lower case on the key by rotating the key in the upward or downward direction.

Here, the controller 420 may display Hangul characters (e.g., vowels and consonants) as well as English alphabet on the prismoid key. In addition, the controller 420 may further display additional alphabets, symbols, and special characters, as well as 'A', 'B', 'C', on an empty space of the prismoid key.

In embodiments of the present invention, each dragging or spinning motion by a user may cause display of characters of a key in turn. Nevertheless, each dragging or spinning motion may be associated with causing display of every other character of the key in turn. That is, the characters associated with the key need not be displayed in respective order. In embodiments of the present invention, how hard and/or fast the key is dragged or spun may determine whether a character is skipped and/or how many characters are skipped.

In embodiments of the present invention, in addition to being three dimensional polyhedrons, the keys may be two dimensional polygons, circular, oval, or other shapes. For example, the keys may be shaped like a circle, square, a pentagon, or the like. If two dimensional, opposite sides of the polygonal key may be used to show the characters. In embodiments with polygonal keys, at least two characters may be associated with the polygons. Accordingly, by dragging or spinning the polygonal key, respective sides thereof may be shown, like a coin being flipped.

In an embodiment using a polygonal key, each corner area of the polygon may be associated with a character. For example, if a pentagon, each of five corners of the pentagon may show a character. For such a pentagonal key, to select a character, a user may spin the pentagon about the center to a selection mark, or simply press on the corner with the character, for example.

In an embodiment of the present invention, a key may have features of a polygonal key and a polyhedron key. For example, when a dodecahedron is used (a polyhedron made up of pentagons), each pentagonal side may include up to 5 characters, respectively, in each corner. Accordingly, a user is then able to drag or spin the entire dodecahedron to a pentagonal side containing a desired character, then either drag (spin) the pentagonal side to a mark, or simply press on the desired character, to select the desired character. By placing multiple letters on each side of a polyhedron, a number of keys needed to Use or display all the scripts or characters for a particular language, can be reduced, for example. Thus, for example, the entire English language alphabet or Korean Hangul characters may be shown by one dodecahedron key. As another example, one polyhedron may be used for consonants of the Korean Hangul characters, another polyhedron may be used for vowels of the Korean Hangul characters, and a third polyhedron may be used for punctuation or other symbols, for a total of three keys. The polyhedrons shown in FIGS. 14-17 may also be used in the way discussed above.

As so far described, the key input method and device according to the embodiments of the present invention have the advantages in that because the keypad including one or more keys having a plurality of characters and sequentially displaying the characters while being rotated is displayed, and then, a character selected from the characters displayed while the key is being rotated is displayed, characters can be quickly and easily inputted.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A key input device, comprising:
   a display unit configured to display a keypad including one or more keys, the one or more keys having a plurality of characters and sequentially displaying the plurality of characters according to a rotation of the one or more keys; and
   a controller configured to display a selected at least one of the plurality of characters displayed according to the rotation of the one or more keys on the display unit,
   wherein when first and second characters of the plurality of characters are simultaneously displayed on one key and the first character is positioned at a center of the one key, the controller displays the first character in a different size from the second character.

2. The device of claim 1, wherein the plurality of characters include vowels and consonants.

3. The device of claim 1, wherein the plurality of characters are vowels or consonants of Korean Hangul or English alphabet.

4. The device of claim 3, wherein the controller is further configured to change an upper case of a character of an English alphabet into its lower case, or a lower case of a character of an English alphabet into its upper case according to a rotation direction of the one or more keys.

5. The device of claim 1, wherein, when a character displayed according to the rotation of the one or more keys is contact-touched or proximity-touched, the controller is further configured to display the touched character on the display unit.

6. The device of claim 1, wherein the display unit includes a touch screen configured to detect a contact touch with respect to the one or more keys or a proximity sensor configured to detect a proximity touch with respect to the one or more keys.

7. The device of claim 1, wherein, when the one or more keys are dragged, the controller is further configured to rotate the one or more keys.

8. The device of claim 1, wherein the one or more keys include at least one of a symbol and a number.

9. The device of claim 1, wherein the one or more keys have at least one of spherical shapes of figures and cubical figures.

10. The device of claim 1, wherein, when the one or more keys are dragged, the controller is further configured to sequentially display corresponding characters within a rotating range of the one or more keys.

11. The device of claim 1, wherein the controller is further configured to display the plurality of characters on the one or more keys by rotating the one or more keys.

12. The device of claim 1, wherein, when the one or more keys are dragged, the controller is further configured to rotate the one or more keys in a same direction as a drag direction at fixed positions of the one or more keys where displayed.

13. The device of claim 1, wherein the controller is further configured to display different characters on the one or more keys according to a rotation direction of the one or more keys.

14. The device of claim 1, wherein the controller is further configured to display the plurality of characters included in a single key, on the single key, by rotating the single key.

15. The device of claim 1, wherein the controller is configured to display the first character in a different color from the second character, when the first and second characters are simultaneously displayed on the one key and the first character is positioned at the center of the one key.

16. The device of claim 1, wherein the controller is configured to display the first character lager in size than the second character, when the first and second characters are simultaneously displayed on the one key and the first character is positioned at the center of the one key.

17. A key input method, comprising:
displaying a keypad including one or more keys, the one or more keys having a plurality of characters and sequentially displaying the plurality of characters according to a rotation of the one or more keys; and
displaying a selected at least one of the plurality of characters displayed according to the rotation of the one or more keys,
wherein when first and second characters of the plurality of characters are simultaneously displayed on one key and the first character is positioned at a center of the one key, the first character is displayed in a different size from the second character.

18. The method of claim 17, wherein the plurality of characters include vowels and consonants.

19. The method of claim 17, wherein the plurality of characters are vowels or consonants of Korean Hangul or English alphabet.

20. The method of claim 19, further comprising: changing a character of an upper case of an English alphabet into its lower case, or a character of a lower case of the English alphabet into its upper case according to a rotation direction of the one or more keys.

21. The method of claim 17, wherein, in displaying the plurality of characters, when a character displayed according to the rotation of the one or more keys is contact-touched or proximity-touched, the touched character is displayed.

22. The method of claim 17, wherein, in displaying the keypad, when the one or more keys are dragged, the one or more keys are rotated.

23. The method of claim 17, wherein the one or more keys include at least one of a symbol and a number.

24. The method of claim 17, wherein the one or more keys have spherical shapes of figures or cubical figures.

25. The method of claim 17, wherein, in displaying the plurality of characters, when the one or more keys are dragged, corresponding characters are displayed within a rotating range of the one or more keys.

26. The method of claim 17, wherein, in displaying the plurality of characters, the plurality of characters are displayed on the one or more keys by rotating the one or more keys.

27. The method of claim 17, wherein, in displaying the keypad, when the one or more keys are dragged, the one or more keys are rotated in a same direction as a drag direction at fixed positions of the one or more keys where displayed.

28. The method of claim 17, wherein, in displaying the keypad, different characters are displayed on the one or more keys according to a rotation direction of the one or more keys.

29. The method of claim 17, wherein, in displaying the keypad, as a single key is rotated, the plurality of characters included in the single key are displayed on the single key.

30. The method of claim 17, further comprising:
displaying the first character in a different color from the second character, when the first and second characters are simultaneously displayed on the one key and the first character is positioned at the center of the one key.

31. The method of claim 17, wherein a size of the first character is lager than that of the second character.

32. An input device, comprising:
a display unit configured to display one or more icons, the one or more icons having a plurality of characters and displaying the plurality of characters according to a rotation of the one or more icons; and
a controller configured to display a selected at least one of the plurality of characters displayed according to the rotation of the one or more icons on the display unit,
wherein when first and second characters of the plurality of characters are displayed on one icon and the first character is positioned at a center of the one icon, the controller displays the first character in a different size from the second character.

33. The device of claim 32, wherein the one or more icons have a three-dimensional structure.

34. A key input device, comprising:
a display unit configured to display a keypad including one or more keys, the one or more keys having a plurality of icons and sequentially displaying the plurality of icons according to a rotation of the one or more keys; and
a controller configured to display a selected at least one of the plurality of icons displayed according to the rotation of the one or more keys on the display unit,
wherein when first and second icons of the plurality of icons are simultaneously displayed and rotated on the keypad, the controller displays the first icon in a different size from the second icon.

* * * * *